April 10, 1928.  E. G. TEMPLETON  1,665,864
DISENGAGING DEVICE
Filed Sept. 17, 1925  2 Sheets-Sheet 1

INVENTOR
Edwin G. Templeton,
BY
ATTORNEY

April 10, 1928. 1,665,864
E. G. TEMPLETON
DISENGAGING DEVICE
Filed Sept. 17 1925   2 Sheets-Sheet 2
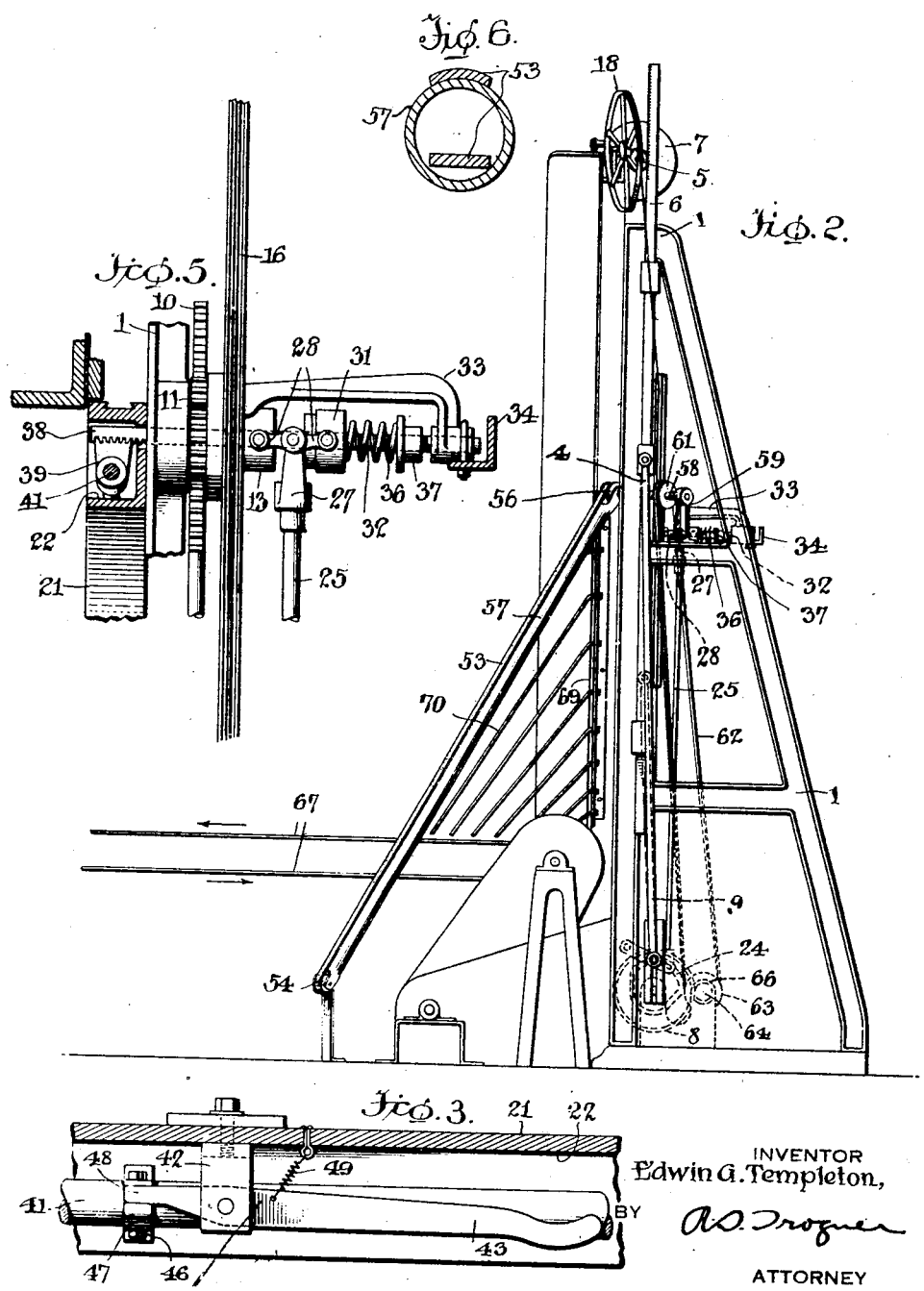
INVENTOR
Edwin G. Templeton,
BY
ATTORNEY Patented Apr. 10, 1928.

1,665,864

UNITED STATES PATENT OFFICE.

EDWIN G. TEMPLETON, OF AKRON, OHIO, ASSIGNOR TO THE GOODYEAR TIRE & RUBBER COMPANY, OF AKRON, OHIO, A CORPORATION OF OHIO.

DISENGAGING DEVICE.

Application filed September 17, 1925. Serial No. 56,985.

My invention relates to machines for handling rubberized fabric and it has particular relation to cutting machines, such, for example, as are employed in preparing bands for pneumatic tires.

The object of my invention is to provide a machine which will disengage severed strips which tend to adhere to the main body of a rubberized textile material and deposit them at regular intervals.

Briefly, the invention embodies means for disengaging adhering strips of fabric and means for placing the individual strips in a conveniently accessible position for subsequent use.

Many branches of the rubber industry have long utilized fabric, which is impregnated with a rubber composition. Although this material is tacky and relatively difficult to handle, it is employed extensively, for example in the manufacture of pneumatic tires and hose and in the production of packings and flange materials. The material is prepared for use by passing sheets of fabric through calendering machines which press a rubber composition into the interstices thereof, after which it is cut into strips, by means of a bias cutter.

When the strips are relatively narrow, their weight is often insufficient to overcome the adhesive tendency of the impregnating rubber and it is not uncommon to have three or four cut strips suspended from the main body of the material. After several bands have been cut, the cumulative weight is sufficient to disengage the group and it is then necessary to separate the individual strips manually.

According to my invention, I have provided means for disengaging the individual strips and depositing them on a conveyor adapted to supply the product in an orderly and convenient manner.

A better understanding of my invention will be had by referring to the drawings, in which:

Fig. 2 is a side view of the machine shown in Fig. 1;

Fig. 3 is a side view, on a larger scale, of a disengaging arm;

Fig. 5 is a detail view which illustrates a means of obtaining oscillating motion; and Fig. 6 is a sectional view of an inclined conveyor.

Figures 1, 4:
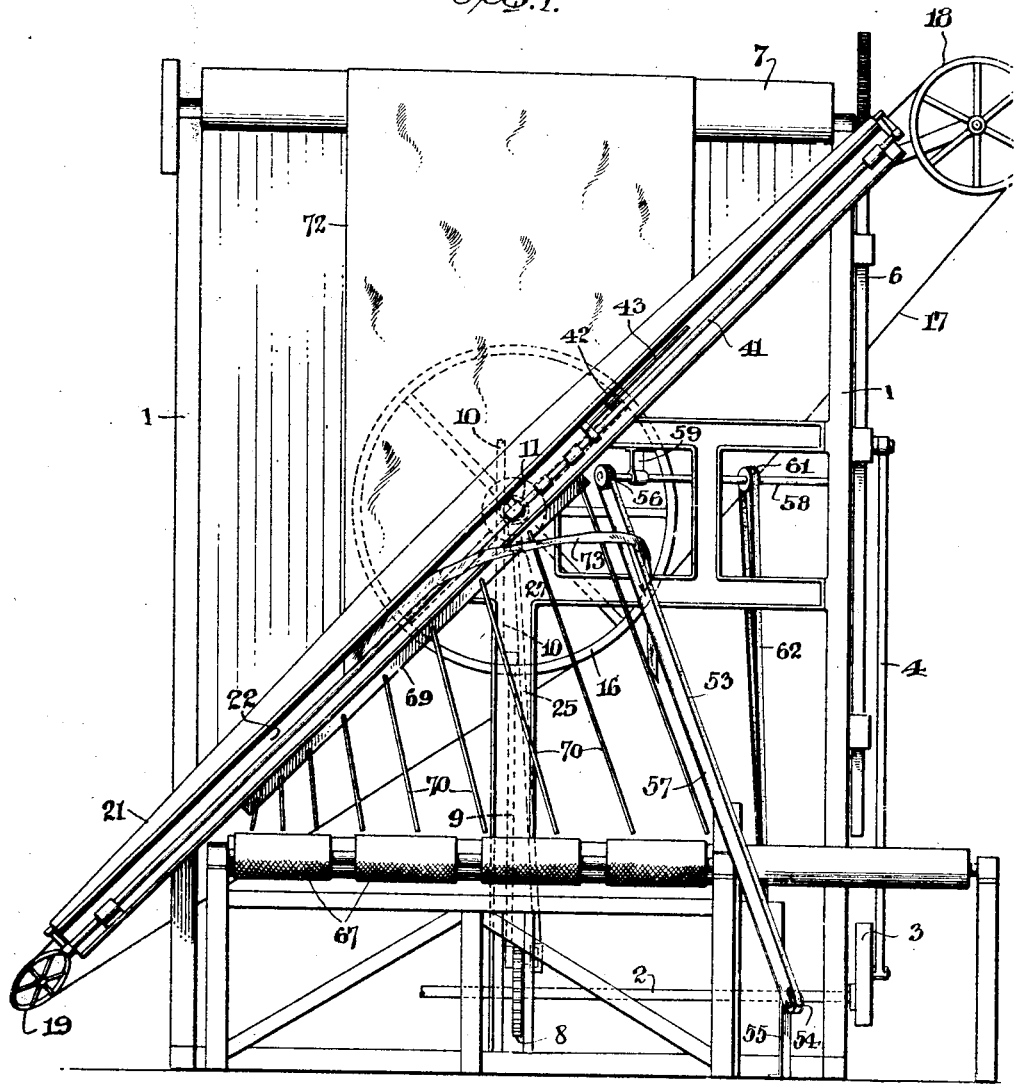
Fig. 1 is a front view of a bias cutter having a take-off device attached thereto which is constructed in accordance with my invention.
Fig. 4 is an end view of the same disengaging mechanism.

One form of my invention is adapted to be employed in conjunction with a bias cutter having a triangular frame 1 and provided at its base with a horizontal drive shaft 2. A crank arm 3 mounted at the outer end of the drive shaft is connected to one end of a pitman rod 4, and the other end of the latter is connected to a vertically movable rack bar 6 that intermeshes with a suitable gear 5 rigidly secured to one end of a feed roller 7.

The inwardly extending portion of the shaft 2 is provided with a gear 8, which pivotally supports a pitman 9. The latter member is pivoted at its upper end to a vertically reciprocable rack 10 which actuates a gear 11, and transmits an oscillatory motion thereto. The gear 11 rotates upon a hollow stud shaft 13 mounted upon the frame 1, and is rigidly secured to the inner face of the hub portion of a knife actuating wheel or pulley 16. This pulley is provided with circumferential grooves for guiding a knife supporting cord 17, which is trained about pulleys 18 and 19, arranged respectively at the upper and lower ends of a cutter bar 21, and is attached at its ends to a knife (not shown), that reciprocates within a slot 22 in the face of the cutter bar.

It will be noted that the gear 8 is provided with a cam groove 24, adapted to receive the lower end of a second pitman 25, which is provided at its upper end with a bifurcated head 27, whose branches are pivoted to a pair of toggle links 28. One of the toggle links is pivoted to the projecting end of the stud shaft 13, and the other is pivoted to a collar 31 that is slidably mounted upon a bar 32. The hollow stud shaft 13 slidably supports one end portion of the bar 32 and the other end portion thereof is slidably mounted in a bracket 33 that is rigidly secured upon the end of the shaft 13 and upon a frame member 34 of the frame 1. A spring 36 disposed about the bar 32 is secured to the collar 31 and to a flanged nut 37 screw-threaded upon the bar 32. Limited reciprocation of the bar 32 is thus caused by the actuation of the pitman 25.

The forward end of the bar 32 is provided with a rack portion 38 which engages a segmental gear 39. The latter, in turn, is rigidly mounted upon a shaft 41, positioned adjacent and parallel to the groove 22 in the cutter bar 21. Movement of the bar 32 thus rotatably actuates the shaft 41. A bracket 42 is secured to the cutter bar within the groove 22 in close proximity to the shaft 41, and serves as a fulcrum for a pivoted arm 43.

The pivoted arm is provided with a projecting rear end 48, which engages a lug 47, upon a collar 46, rigidly secured to the shaft 41. The projecting end 48 normally is maintained in contact with the lug by means of a spring 49, which resiliently secures the arm 43 to the rear of the cutter bar 21.

The invention also includes a mechanism comprising a belt 53 mounted upon an idler pulley 54 and a driving pulley 56, which are secured within bifurcated end portions of a tube 57, the latter also serving as a guide for the lower reach of the belt. A bracket 55 secured to the floor or foundation of the machine supports the lower end of the tube 57.

The pulley 56 is also secured upon the end of a drive shaft 58 mounted in brackets 59 carried by the framework of the bias cutter. The drive shaft 58 is actuated by any suitable means such as a pulley 61 having a drive belt 62 connected thereto, which is trained about a second pulley 63, rigidly secured to a shaft 64. The lower portion of the frame rotatably supports the shaft 64.

A pinion 66 secured to the shaft 64 engages the gear 8, and is actuated when the shaft 2 is rotated.

A system of horizontally traveling belts 67, mounted upon suitable rollers 68 not shown, is positioned below the cutter bar 21 and is adapted to be operated continuously during the operation of the apparatus. A guard or frame work 69 is secured to the cutter bar 21 and is provided with fingers 70 extending at an incline toward the conveyor belts 67.

In the operation of the cutting mechanism the rotation of the shaft 2 causes the rack bar 6 to reciprocate through the agency of the crank arm 3, and the pitman rod 4 and, in turn, intermittently rotates the feed roller 7, thereby causing a sheet of rubberized fabric 72 to be fed forwardly to the cutting mechanism. The pitman rods 9 and 25 operate in synchronism, and when the pitman 9 approaches the end of its stroke and has thereby caused a strip 73 to be severed from the end of the fabric sheet 72, along the cutter bar 21, the pitman 25 is then operated and causes the rack bar 38 to rotate the segmental gear 39 and thus transmit an oscillatory movement to the pivoted arm 43. The latter then strikes the strip of fabric which remains adhering to the main sheet of material, and loosens it at the upper portion thereof. The strip of fabric so freed from the cutter bar and main sheet of material will drop against the belt 53. Thereafter the strip is thrown by the belt 53 upon the conveyor belts 67 and is transported away from the machine. The fingers 70 of the guard 69 prevent the strip from falling beyond the end of the conveyor belts 67.

It will be evident that by practicing my invention, the former difficulty of having several strips disengaged as a unit has been obviated. Moreover, it is unnecessary to have several workmen disengaging the product of the cutter. The means which I have utilized to effect my invention is simple and inexpensive yet its value may readily be appreciated. Other means may be substituted for the disengaging arm. For example, a jet of compressed air may be directed toward the end of the cut adhering strip in order to effect disengagement. The jet may be a continuous one or of an intermittent character which is synchronized with the movements of the bias cutter in somewhat the same manner as that described hereinabove.

Although I have described but two variations, it will be apparent to anyone skilled in the art that many modifications may be employed without departing from the scope of the invention and I desire, therefore, that only such limitations shall be imposed as are in accord with the appended claims.

What I claim is:

1. A strip removing device for bias cutters comprising disengaging means, an inclined belt conveying mechanism and a plurality of strip supporting members arranged substantially parallel to the belt mechanism and adapted to deposit the strips in substantially horizontal position.

2. A device for removing strips of fabric from a bias cutter comprising a pivoted elongate disengaging arm resiliently maintained in idle position and actuated therefrom intermittently by an oscillatory lug, a plurality of inclined supporting members and a driven belt conveyor adapted to deliver the strips in substantially horizontal position.

3. A device for detaching severed adhering strips from a sheet of rubberized fabric comprising a member adapted to strike the severed strip a sharp blow, and means to actuate the member.

4. A device for detaching severed strips from a sheet of rubberized fabric comprising a pivoted arm adapted to strike the strip and means to actuate the pivoted arm.

5. A device for detaching adhering severed strips from a sheet of rubberized fabric comprising a pivoted arm, an extension upon the arm, a lug adapted to engage the extension, and a shaft for rotating the lug to cause it to impart a sudden movement to the pivoted arm.

6. A device for detaching adhering severed strips from a sheet of rubberized fabric comprising a movable member adapted to strike the strip a sudden blow, means to actuate the member, and means to convey the detached strip away from the detaching device.

7. A device for detaching severed strips of rubberized fabric from a continuous sheet comprising a member adapted to strike the severed strip a sudden blow, means for actuating the member, and means comprising inclined guide fingers adapted to convey the detached strip away from the detaching device.

8. A device for detaching strips of severed fabric from a sheet of such material comprising a member adapted to strike the severed strip a sudden blow, means to actuate the member, means to carry the detached strip away from the detaching device comprising inclined fingers positioned adjacent the detaching device and a moving member adapted to engage the strip to accelerate its movement.

9. A device for detaching severed strips from a sheet of rubberized fabric comprising means to loosen one end of the strip, means for conveying the strip away from the detaching device comprising guide fingers positioned adjacent the detaching device and a moving conveyor member positioned to engage the detached end of the strip and adapted to accelerate the movement of the disengaged end.

10. A device for detaching severed strips from a sheet of rubberized fabric comprising means to loosen one end of the strip, means for conveying the strip away from the detaching device comprising guide fingers positioned adjacent the detaching device and a moving conveyor member positioned to engage the detached end of the strip and adapted to accelerate the movement of the disengaged end, said means comprising a conveyor belt associated with the guide fingers.

In witness whereof, I have hereunto signed my name.

EDWIN G. TEMPLETON.